United States Patent
Smith

(10) Patent No.: US 7,528,511 B2
(45) Date of Patent: May 5, 2009

(54) COOLING SYSTEM FOR A VEHICLE DRIVE ASSEMBLY

(76) Inventor: H. Kevin Smith, 332 Cherry St., Latrobe, PA (US) 15650

( * ) Notice: Subject to any disclaimer, the term of this patent is extended or adjusted under 35 U.S.C. 154(b) by 374 days.

(21) Appl. No.: 11/245,928

(22) Filed: Oct. 7, 2005

(65) Prior Publication Data
US 2008/0001486 A1   Jan. 3, 2008

(51) Int. Cl.
H02K 9/00   (2006.01)

(52) U.S. Cl. .................... 310/68 C; 310/52; 310/89

(58) Field of Classification Search .......... 310/68 C, 310/52, 62–63, 89, 98
See application file for complete search history.

(56) References Cited

U.S. PATENT DOCUMENTS

| | | | |
|---|---|---|---|
| 4,914,329 A * | 4/1990 | Ottersbach | 310/68 C |
| 5,763,969 A * | 6/1998 | Metheny et al. | 310/62 |
| 5,844,333 A | 12/1998 | Sheerin | |
| 5,921,829 A | 7/1999 | Iwata | |
| 5,939,808 A | 8/1999 | Adames | |
| 6,531,795 B2 * | 3/2003 | Weimer | 310/53 |
| 6,882,068 B2 * | 4/2005 | Weeber et al. | 310/59 |
| 2008/0030087 A1 | 2/2008 | De Filippis et al. | |

* cited by examiner

*Primary Examiner*—Thanh Lam
(74) *Attorney, Agent, or Firm*—Timothy A. Nathan

(57) ABSTRACT

A cooling system for use in a vehicle drive assembly having an electric drive with a rotor and a stator is disclosed. The cooling system is adapted to cool the rotor via a liquid coolant or by directing a cooling air flow between the rotor and stator using an independent control capable of independent operation.

9 Claims, 7 Drawing Sheets

COOLING SYSTEM FOR A VEHICLE DRIVE ASSEMBLY

BACKGROUND OF THE INVENTION

1. Field of the Invention

The present invention relates to integral, brushless permanent magnet drives; and in particular to cooling systems for integral, brushless permanent magnet drives used to power vehicles such as watercraft, aircraft, automobile, commercial and industrial vehicles or other industrial equipment.

2. Description of the Related Art

Most contemporary vehicles are driven by internal combustion engines. These engines convert potential energy stored in a fossil fuel into kinetic energy. As a byproduct of producing energy from combustion of a fossil fuel, these engines tend to generate large amounts of excess heat which can cause the engine to overheat and ultimately fail. In order to keep the temperature of these engines within a safe operating range, they are often cooled by an external cooling system.

In the case of automobile engines (and many aircraft engines), coolant is pumped into the engine through a fluid conduit. Heat is extracted from the engine into the coolant. The heated coolant is then pumped out of the engine and through a heat exchanger where the heated coolant is cooled by air or an external fluid coolant. In the case of outboard internal combustion engines used in watercraft, the engine is cooled by pumping water from the body of water on which the watercraft is located through the engine. The heated water is then discharged back into the body of water.

Although internal combustion engines and their associated cooling systems have operated effectively for their intended purpose, they also have several drawbacks. During the combustion of a fossil fuel, a majority of the stored energy is lost to heat, friction, or discharged as uncombusted fuel in the exhaust. Typically, internal combustion engines average around 30% efficiency. Secondly, internal combustion engines cannot be used in a bidirectional energy conversion system. Once the fossil fuel has been converted into kinetic energy, the kinetic energy cannot be converted back into a fossil fuel to store the potential energy. Another drawback to using fossil fuels is that a fossil fuel may be accidentally ignited if not handled properly. They are also poisonous to humans and discharge hazardous chemicals into the environment when combusted.

To overcome many of the disadvantages present in internal combustion engines, various electric drives have been suggested either in combination with an internal combustion engine (hybrid electric vehicles) or alone to completely replace the internal combustion engine (electric vehicles). Electric drives provide several advantages over internal combustion engines. Electric drives do not discharge harmful exhaust gases into the environment. With the selection of an appropriate battery, the battery is not combustible and does not require direct human contact, and is thus less hazardous to the user.

An electric drive converts potential energy stored in a battery into kinetic energy when operated in the motor mode. Ideally, these drives also have a second mode in which the drive converts kinetic energy from rotating the rotor into potential energy stored in the battery. Electric drives are particularly well suited for these bidirectional, or energy recapture systems, because they can reach efficiencies approaching almost 90%. The most common DC drives used in these recapture systems are controlled induction drives, permanent magnet drives, and switched reluctance drives. Controlled induction drives can reach approximately 90% efficiency; switched reluctance drives can reach approximately 92% efficiency; and, permanent magnet drives can reach approximately 94% efficiency. Although the differences in efficiency between these drives appear to be relatively small, even small differences can be quite significant in a bidirectional energy conversion system especially when large integral horsepower drives are used.

As can be seen from the above, brushless permanent magnet drives ("BPMD's") are capable of the highest idealized maximum efficiency. However, BPMD's have a variety of losses which prevent these motors from reaching this level of efficiency when large integral horsepower motors are used. The losses experienced by BPMD's come from windage losses due to spinning the rotor, friction losses in the moving parts such as the bearings, copper losses due to generating heat in the stator windings, and iron losses due to generating heat in the stator. The two most significant losses in these motors are the iron losses and copper losses.

Aside from these direct efficiency losses in large horsepower BPMD's, the heat generated by these loses can result in additional parasitic losses due to a decreased magnetic force capacity in the magnets. For instance, in Five (5) horsepower and larger motors, the temperature of the interior of the motor can reach in excess of 100 to 120 degrees Celsius. The stator components such as the varnish coating, wire insulation, etc. can typically withstand temperatures up to approximately 200 degrees C. However, it is desirable to use high capacity magnets such as Neodymium-Iron-Boron magnets because of their high energy product. Unfortunately, these magnets can withstand temperatures of only about 100 degrees Celsius. At temperatures above 100 degrees Celsius, the magnets begin to irreversibly degrade.

Effective cooling systems are necessary when used on integral horsepower motors. One approach described in the art is the use of a fan attached to the shaft of the motor which either pushes or pulls air through the air gap between the rotor and the stator. These cooling systems provide a cooling airflow to the motor; however, they lack efficiency which is critical in bi-directional vehicle applications. The fan is coupled to the rotor shaft and rotates at the same RPM as the rotor. At low motor speeds or when the rotor is stopped, this may prove to provide insufficient cooling to the rotor magnets. Alternatively, at high speeds, the fan may be spinning too fast and result in cooling the rotor magnets more than is necessary.

Another solution known in the art is to use an external cooling system. For instance, U.S. Pat. No. 5,939,808 to Adames discloses a motor having a rotor, a stator, and a drive housing. The drive housing includes an separate cooling system including a conduit embedded in the housing and connected to a heat exchanger. Cool fluid is pumped through the housing and heated. The heated fluid is then returned to the heat exchanger and cooled down before returning to the drive housing.

Although having an external cooling system has advanced the art, even this device has drawbacks. For instance, this cooling system does not have an independent control. Although a separate pump is disclosed, the pump is operated at a constant speed. In addition, the device described in the '808 patent, does not have a feedback loop to provide for a closed-loop control. Accordingly, this device has many of the same drawbacks found in fans directly coupled to the rotor. The cooling system may either overcool the rotor magnets and waste energy or under cool the rotor and risk irreparably degrading the magnet quality. In any event, the cooling system does not have any way to determine the amount of cooling needed. Another drawback to this device is that cooling conduits are located in the housing. Aside from the manufacturing difficulties this presents, this location distances the maximum cooling capacity from the rotor and rotor magnets, which are the most temperature sensitive components in integral brushless permanent magnet drives. In order to provide an adequate amount of cooling to the rotor magnets utilizing this system may require excessive operation of the cooling system to compensate for being distanced from the rotor magnets.

Accordingly, it would be desirable to have a high efficiency integral electric drive. It would also be desirable to have a high efficiency integral drive capable of high torque without magnet degradation due to overheating. It would be further desirable to have a cooling system for an electric drive which is configured to cool the rotor magnets. It would be still further desirable to have a cooling system for an electric drive which has a control which is independent of the motor operation.

SUMMARY OF THE INVENTION

In accordance with the broad teachings of the invention, a cooling system for a vehicle drive is disclosed in multiple embodiments. Each embodiment overcomes one or more of the deficiencies present in the current state of the art. One embodiment of the present invention provides a cooling system for use in a vehicle drive assembly having an electric drive. The electric drive includes a stationary stator, a corresponding rotor and a drive housing. The rotor rotates relative to the stator in response to a rotating electrical field generated in the stator.

One novel aspect of this embodiment of the invention is that the cooling system has a fan attached to the electric drive capable of independent operation relative to the operation of the electric drive. The fan is controlled by an independent fan motor controller so that the fan may be operated independently from the electric drive to optimize cooling efficiency. The independently controlled cooling system enables the movement of outside ambient air into the interior of the housing, for the most part passing through the gap between the rotor and stator, over the magnets, and then exiting at a higher temperature through a housing exit port. The magnets are cooled by passing ambient air into the gap region.

The operation of the fan can be controlled thermostatically, actuating fan operation at or above a desired temperature, irrespective of the drive motor operation status (i.e., drive motor full load, half load, turned off but hot from full load operation, etc.). Alternatively, the speed of the cooling fan could be controlled dependent on the level of cooling required. It is also realized that other means of controlling the fan to enable effective cooling of the motor can be utilized such as fan control that is integrated with the drive motor controller, programmed control, etc.

In another embodiment of the present invention, the cooling system includes a fluid coolant captured within the drive housing. The amount of fluid contained within the drive housing may vary from drive to drive. In any event, the amount of fluid contained with the drive housing is sufficient so that the fluid is proximate to the rotor magnets to permit convective cooling between the fluid and rotor magnets. Alternatively, the amount of fluid may also be sufficient to directly contact the magnets and thus permit direct conductive cooling of the magnets. Once heated, the warm fluid coolant is then pumped out of the drive housing and into a heat exchanger to cool the coolant. The amount of heat removed from the motor is a function of the fluid's specific heat, temperature rise of the fluid, and the fluid flow rate. The rate of heat removal can be varied by controlling the flow rate of the fluid. The cooled fluid coolant is then pumped back into the drive housing.

In yet another embodiment of the present invention, the cooling system includes a fluid coolant captured within the drive housing. The coolant is selected so that its temperature of evaporation, or the boiling point temperature, is equal to or less than the safe operating temperature of the rotor magnets. Once the coolant has evaporated and rises, it is captured by a conduit and is free to pass through a heat exchanger, or condenser. Once the coolant has condensed back into a fluid in the heat exchanger or condenser, and released its heat of condensation to the condenser/heat exchanger, the coolant is then passed by gravity flow back into the drive housing. If required, a pump could be used to move the condensed fluid back into the housing. Since the heat of vaporization of the selected fluid is utilized to absorb heat within the motor and transport the heat to the condenser/heat exchanger, a much larger quantity of heat can be removed per unit amount of fluid than if the specific heat of the fluid were only used.

This embodiment provides cooling to the electric drive without the use of an external pump system or without the use of a thermostat switch to activate and control the cooling system. The fluid selected for the desired thermodynamic properties such boiling point temperature, heat of vaporization, vapor pressure, etc. can be a single fluid, a compound, or a combination of two or more fluids or compounds that would provide the desired thermodynamic properties.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE PRESENTLY PREFERRED EMBODIMENTS OF THE INVENTION

Figure 1:
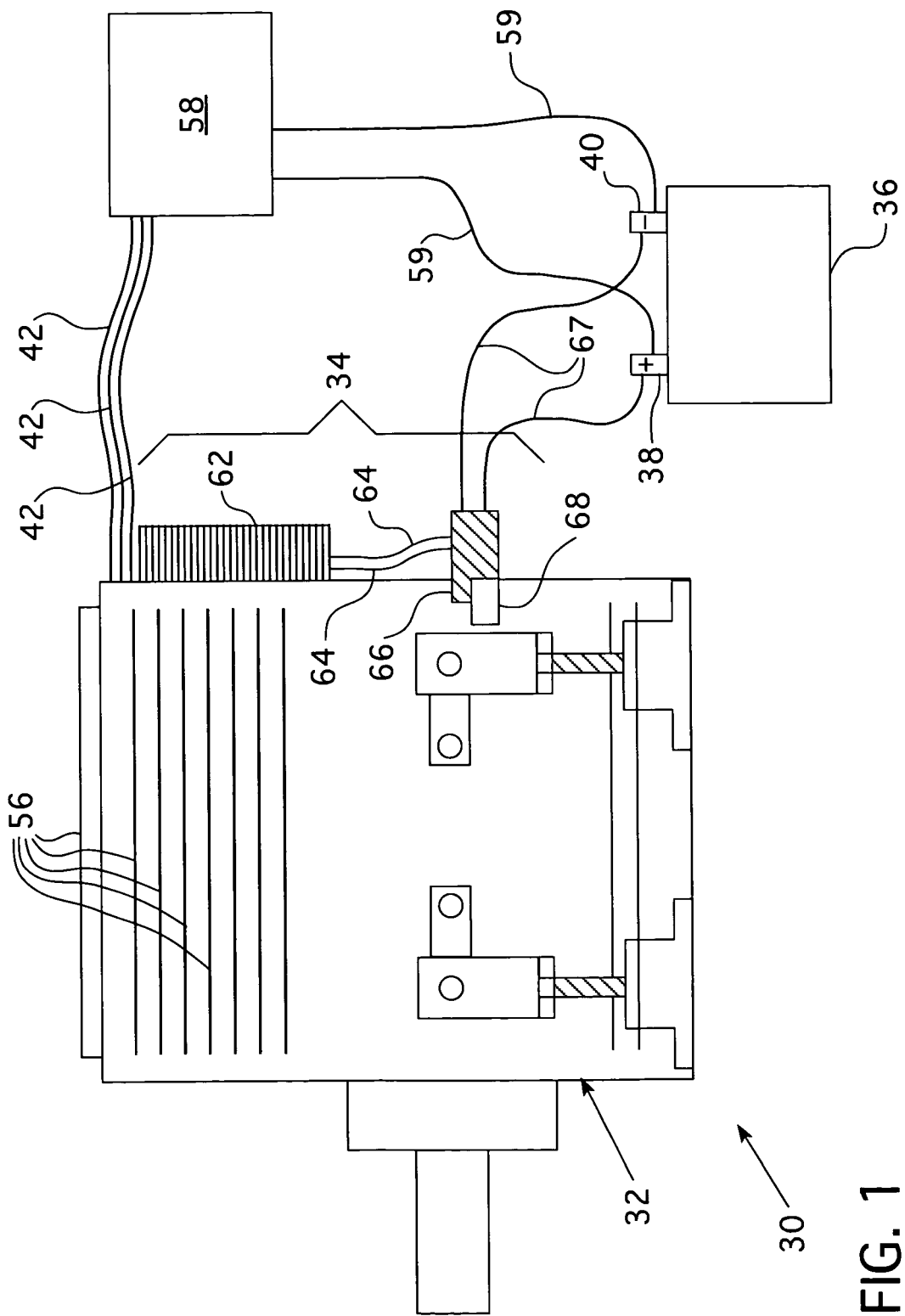
FIG. 1 is a side view of a vehicle drive assembly.
Figure 2:
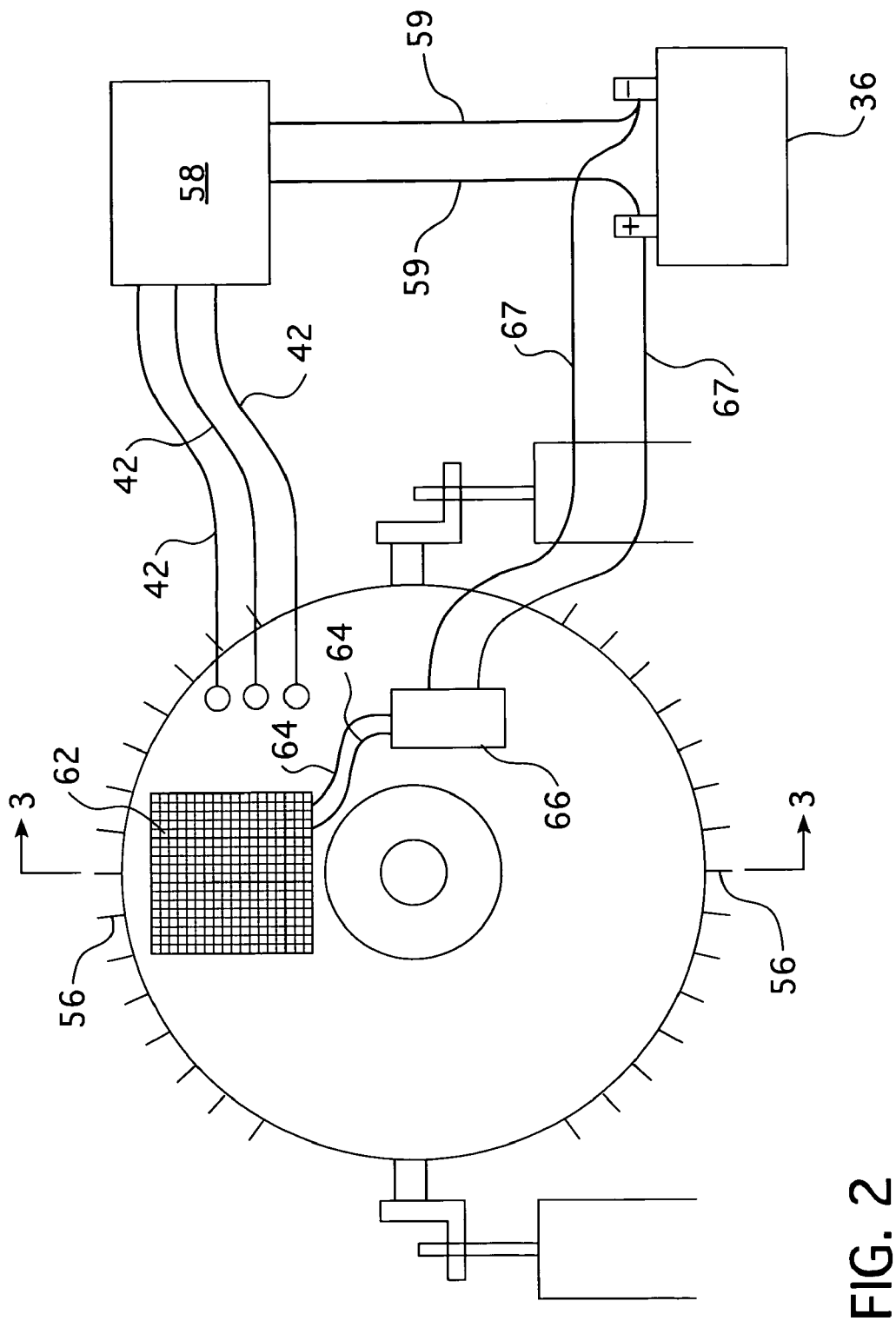
FIG. 2 is a rear perspective view of the vehicle drive assembly.

FIG. 1 schematically illustrates an exemplary embodiment of a vehicle drive assembly 30 according to the principles of the present invention. The vehicle drive assembly has an electric drive system 32 and a cooling system 34 connected to the electric drive system. The electric drive system 32 includes a storage device 36 for storing electrical potential energy between a positive pole 38 and a negative pole 40 of storage device 36. The storage device may be any device capable of storing electrical energy such as a dry-cell battery, a lead-acid battery, or a gel-cell battery. Of course any device that is capable of storing electrical potential energy may be used without departing from the teachings of the present invention. The poles 38 and 40 are connected to the motor via conductors 42.

Figure 3:
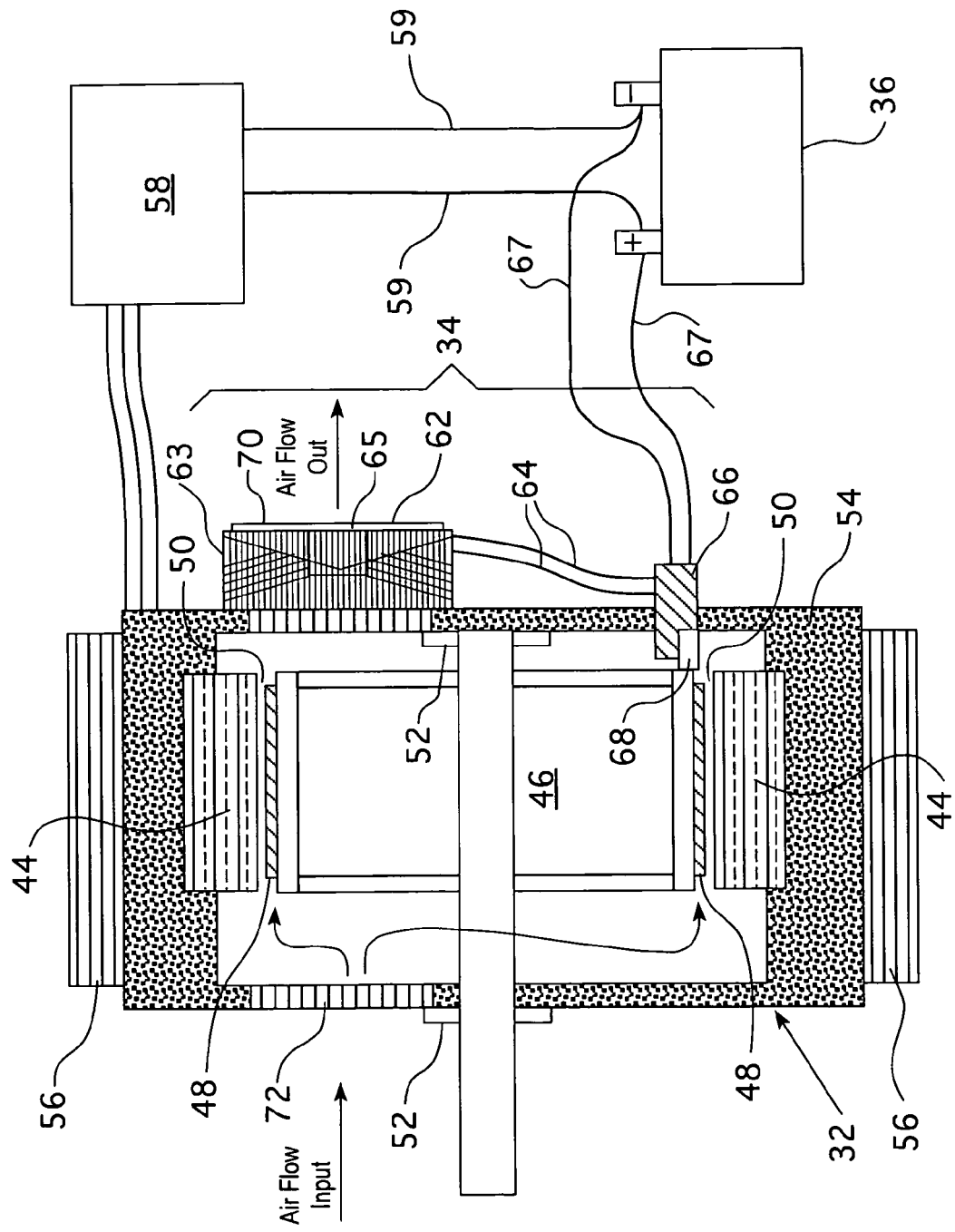
FIG. 3 is a side cross-sectional view of the vehicle drive assembly along line 3-3 of FIG. 2.

Turning briefly to FIG. 3, the electric drive system 32 is a brushless, permanent magnet drive and has a stator 44 and a coaxially aligned rotor 46 defining an air gap 50 therebetween. Of course, any suitable electric drive could be used such as controlled induction drives, or switched reluctance drives. In addition, the drive shown in FIG. 3 depicts an internal rotor design. However, external rotor drives or axial drives can also be used. Rotor 46 includes magnets 48 about the external surface of the rotor. The magnets may be constructed from any magnetic material. Preferably, magnets 48 are formed from high electrical density magnets such as Neodymium-Iron-Boron magnets. The rotor is retained coaxial relative to the stator by bearings 52. The stator core is formed from stacked laminations, not shown, with inwardly directed teeth which are wrapped by windings, not shown. A drive housing 54 encloses the drive and has cooling fins 56 extending from the surface of the drive housing to assist in cooling stator 44. The electric drive also includes a controller 58 connected to the stator windings which are selectively energized to create a rotating electrical field which in turn rotates rotor 46. The controller is connected to the storage device via conductors 59.

Turning now to FIG. 3, the cooling system 34 includes a fan 62 having an impeller 63 which is powered by fan motor 65 connected to storage device 36 via conductors 64. Vehicle drive assembly 30 also includes an independent cooling system control 66 connected to the storage device 36 via conductors 67. The independent cooling system control 66 provides a distinct advantage in that it permits optimum control of the cooling system via conductors 67. The cooling system may be operated when the drive has stopped or when it is running at a low RPM. When the drive is operated at a low speed in a hot environment with a corresponding hot temperature within drive housing 54, cooling system 34 may operate at an increased rate to maintain rotor magnets 48 within an appropriate operating temperature. In addition, this aspect of the present invention provides an additional level of security over contemporary cooling systems which utilize a fan mounted on the rotor shaft. In the event that rotor 46 becomes locked and the motor begins to overheat, cooling system 34 would activate to cool the rotor magnets and protect the heat from damaging the electric drive system. Furthermore, when the motor is operating at high RPM's in a cold operating environment, it may be desirable to operate the cooling system at a slow speed or even stop the cooling system to prevent unnecessary cooling and thus increasing the system's overall efficiency of the electric drive system.

The independently controlled aspect of the cooling system enables the movement of outside ambient air into the interior of drive housing 54, for the most part passing through air gap 50 between rotor 46 and stator 48, over magnets 58, and exiting at a higher temperature. The magnets are therefore cooled by the focused cooling through the air gap 50. The operation of the fan 62 may be controlled thermostatically where the fan is actuated at or above a desired temperature within the drive housing, irrespective of the drive motor operation status (i.e., drive motor full load, half load, turned off but hot from full load operation, etc.). Alternatively, the speed of fan 62 could be controlled depending on the level of cooling required. It is also contemplated that other means of controlling the fan may be utilized to enable effective cooling of the motor.

The cooling system may have a temperature sensor 68 such as a thermistor attached to the electric drive system proximate the rotor magnets. However, any type of temperature sensor 68 may be used in accordance with this invention. The temperature sensor 68 is attached to stator 44 proximate rotor 46 since maintaining the magnets at an optimum operating temperature is critical to the efficient operation of the electric drive system.

As seen in FIG. 3, fan 62 is enclosed by a fan guard 70 mounted to drive housing 54. The drive housing 54 also includes an air filter 72. Air is drawn in through air filer 72, through air gap 50, and out through cooling system 34. Drawing cooling air across the stator magnets assists in cooling drive 32 and specifically magnets 48. Alternatively, fan 62 can be configured to push air into drive housing 54 and out through air filter 72. In addition, fan 62 could be mounted in a separate housing and routed into drive housing via a piping system, not shown.

Figure 4:
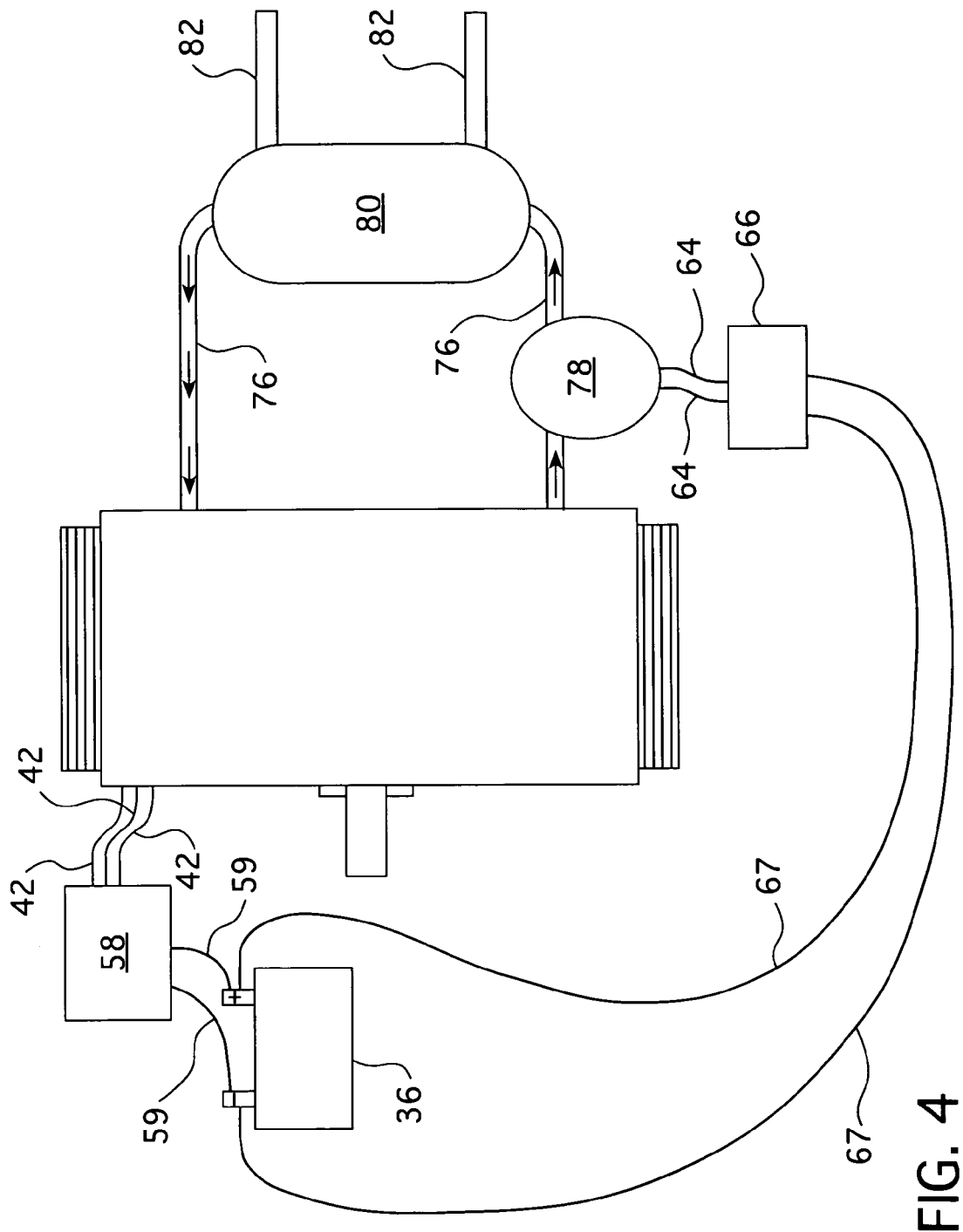
FIG. 4 is a side elevational view of a second embodiment of the present invention.
Figure 5:
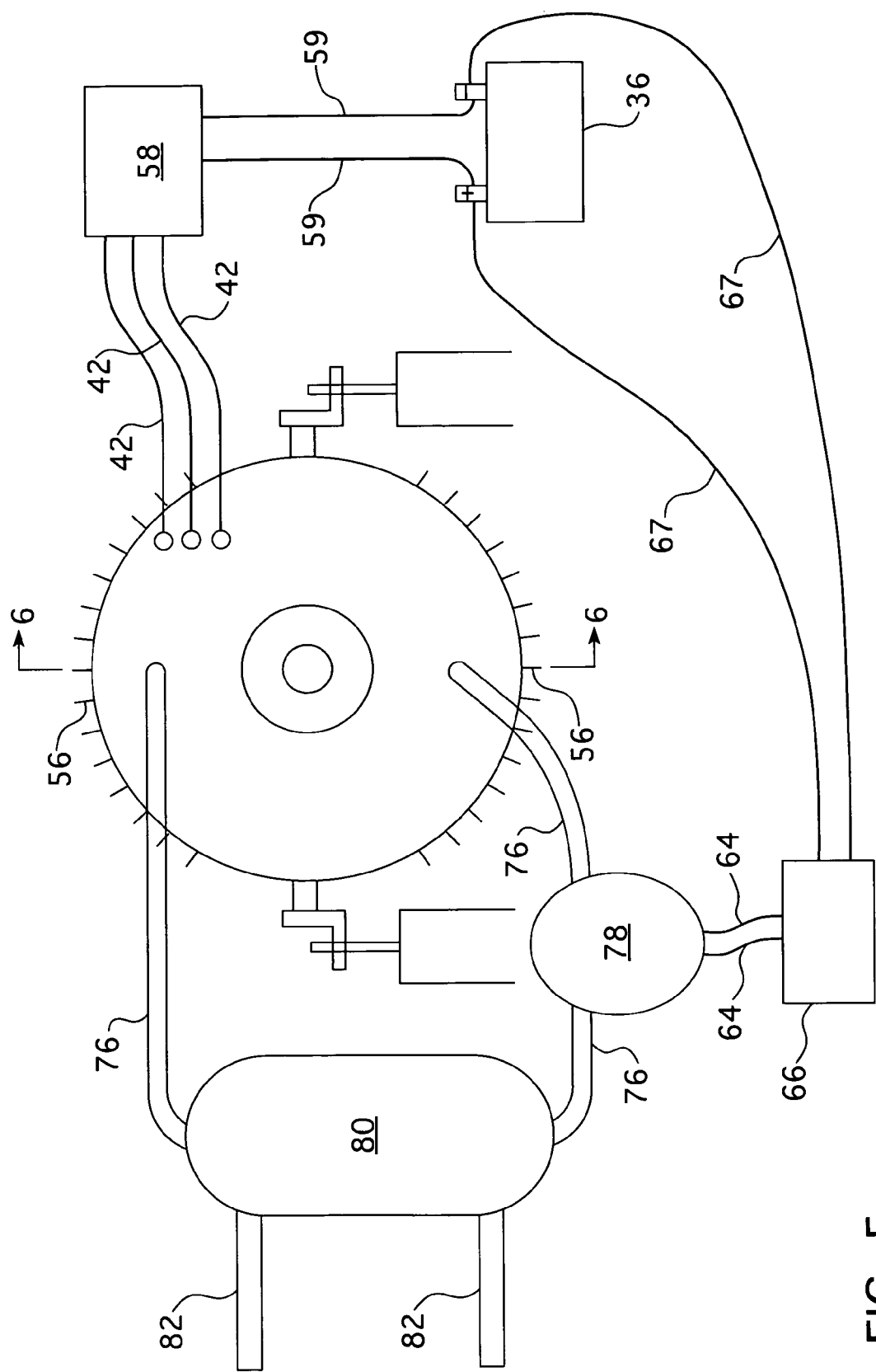
FIG. 5 is a rear elevational view of the second embodiment.
Figure 6:
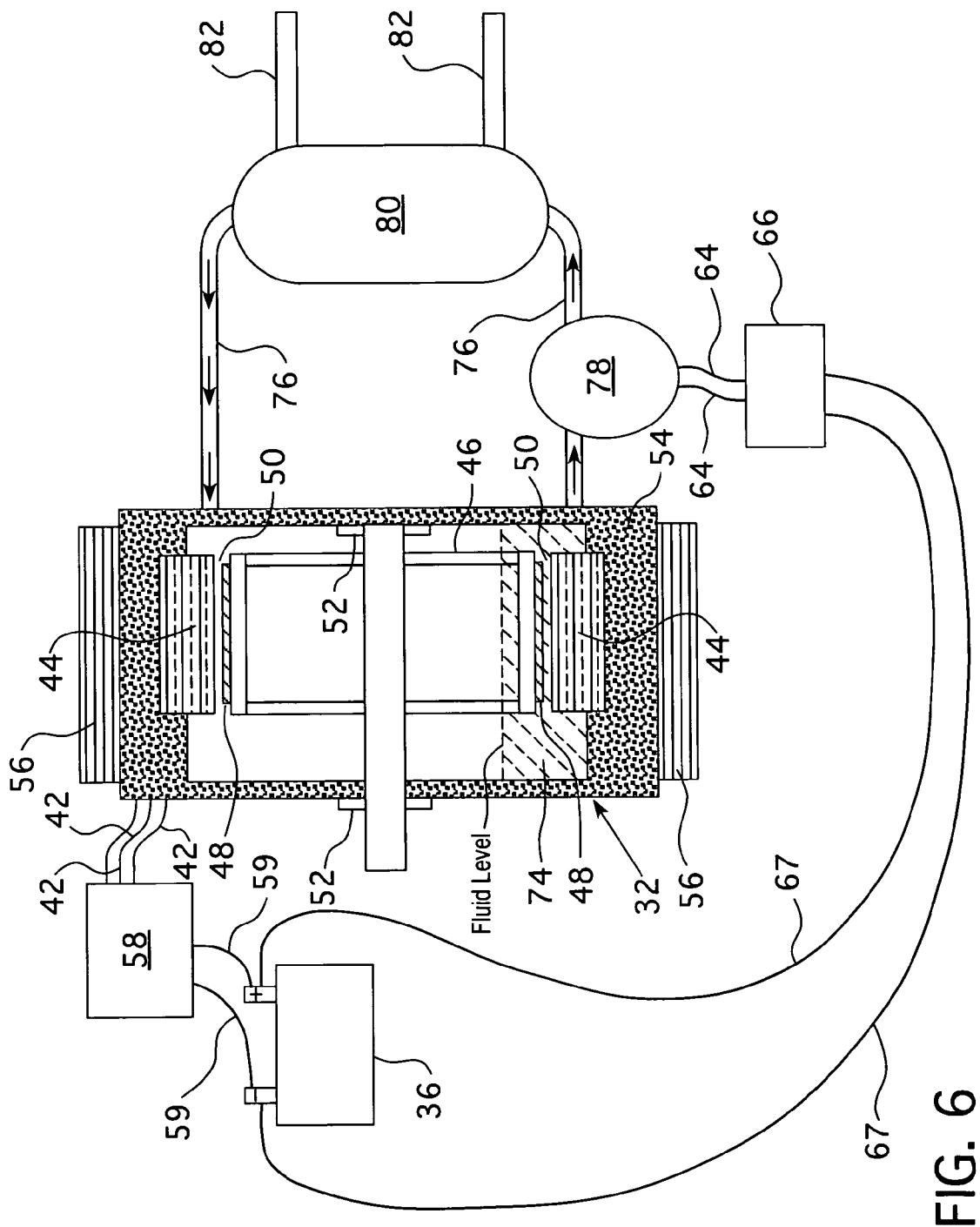
FIG. 6 is a side cross-sectional view of the second embodiment along line 6-6 of FIG. 5.

A first alternative embodiment of the present invention is shown in FIGS. 4-6. Rather than cycling cooling air thorough the electric drive system, the drive housing in this embodiment is at least partially hermetically sealed. A cooling fluid 74 is disposed within drive housing 54. The cooling fluid may be selected for its desired thermodynamic properties such as boiling point temperature, heat of vaporization, vapor pressure, etc. One of ordinary skill in the art can readily appreciate that the cooling fluid may be a single fluid (or compounds), or a combination of two or more fluids (or compounds) chosen to provide the desired thermodynamic properties. For instance, a variety of organic and inorganic chemicals and compounds may be used either alone or in combination as cooling fluid 74 such as saturated and unsaturated hydrocarbons, alcohols, freons, aldehydes, ketones, acids, esters, amines, amides, imides, imides, polycyclic, aromatic, silanes, silicons, silicones, thio or nitro type or based compounds.

A sufficient amount of cooling fluid 74, as seen in FIG. 6, is contained within the drive housing 54 such that the fluid is proximate rotor magnets 48 to provide convective cooling. Alternatively, a sufficient amount of cooling fluid may be located in drive housing 54 such that cooling fluid 74 contacts rotor magnets 48 for direct conductive cooling. The cooling fluid 74 is cycled through the drive housing via a fluid conduit 76 by a pump 78 connected to the fluid conduit. Pump 78 is controlled by independent controller 64. As in the previous embodiment, independent controller 64 may operate independent of controller 58. However, one of ordinary skill in the art can best appreciate that independent controller 64 and controller 58 may be commonly located in the same housing. Moreover, these two separate controllers may be commonly located on the same circuit board. Independent control 62 and controller 58 may be a digital signal processor or and application specific integrated circuit.

The conduit is connected to a heat exchanger 80. In this embodiment, heat exchanger 80 is a liquid-to-air heat exchanger. However, any heat exchanger capable of sufficiency cooling the air or cooling fluid 74 used to cool electric drive system 32 can be used without departing from the spirit or scope of the present invention. A second conduit 82 is connected to heat exchanger 80 to deliver cool external water to the heat exchanger. In the case of watercraft, external water may be drawn from the body of water on which the watercraft is located and pumped into heat exchanger 80. This provides the advantage of using water from the body of water and a nearly infinite cooling capacity without risking the potential of passing debris into electric drive system 32.

Figure 7:
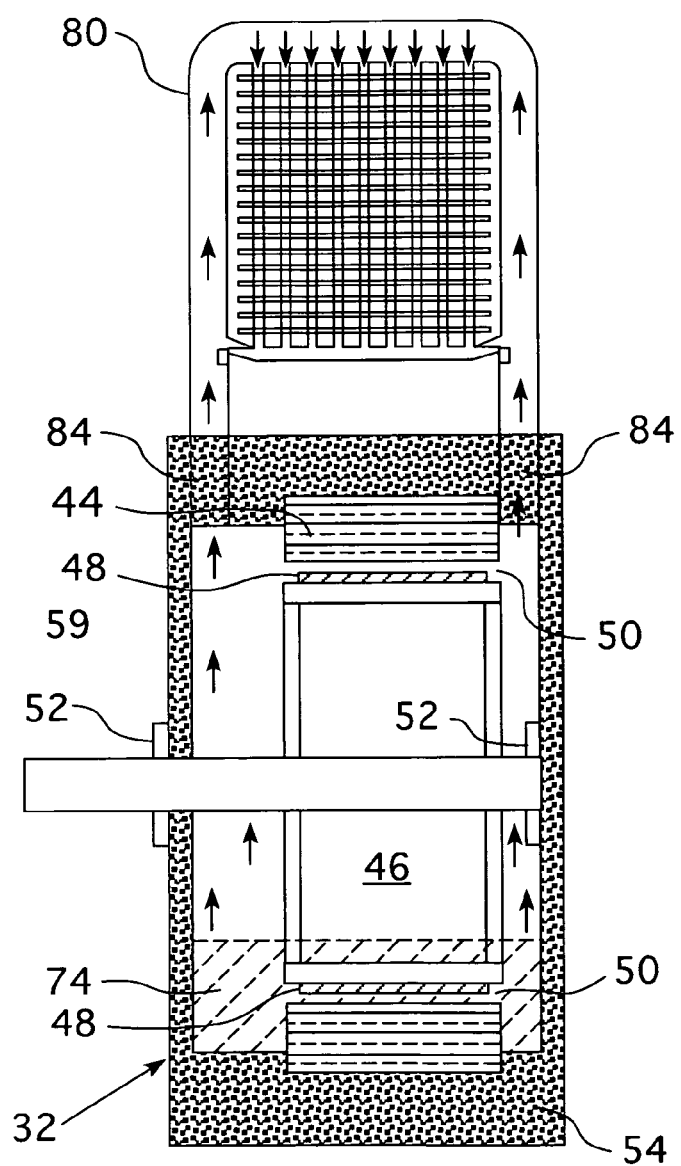
FIG. 7 is a side elevational view of a third embodiment of the present invention.

A second alternative embodiment of the present invention is shown in FIG. 7. In the previous embodiments of the present invention an optimum magnet temperature is achieved by active control though either open-loop or closed-loop control of cooling system 34. However, this invention also contemplates a passive system of maintaining an appropriate temperature without the additional expense or complexity of electric controls as used in the previous embodiments. In this embodiment of the invention, cooling fluid 74 is selected which has a temperature of evaporation at or below 100 degrees Celsius. The cooling fluid 74 evaporates and rises as a vapor with drive housing 54. This embodiment of the invention includes a channel 84 connected to a liquid-to-air heat exchanger 80. Once the heated vapor cools adequately, cooling fluid 74 then condenses back into a fluid state. In this state, the cooling fluid then drips back down into drive housing 54. Uniquely, this embodiment does not require the use of extra electronics while still being capable of maintaining magnets 48 at an appropriate temperate. By maintaining electric drive system 32 at an appropriate operating temperature without the addition of a another electrical device such as fan 62 or pump 78 further enhances the overall efficiency of this embodiment of vehicle drive assembly 30.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

What is claimed is:

1. A cooling system for an electric drive system, the electric drive system having a stator with a coaxially disposed rotor, the electric drive system further includes a drive housing, the cooling system comprising:
   a fan operatively associated with the electric drive system, wherein the fan is oriented to direct airflow between the stator and the rotor of the electric drive system; and
   an independent controller for controlling the fan, the independent controller being independent of the electric drive system such that the fan may operate at a different speed than the speed of the electric drive system.

2. The cooling system as recited in claim 1, wherein the fan is attached to the drive housing.

3. The cooling system as recited in claim 1, wherein the fan comprises: an impeller; and a fan motor coupled to the impeller.

4. The cooling system as recited in claim 3, wherein the cooling system further comprises a temperature sensor attached proximate the rotor and in communication with the independent fan controller.

5. The cooling system as recited in claim 4, wherein the temperature sensor is suspended to measure air in the drive housing.

6. The cooling system as recited in claim 1, wherein the stator and the rotor are spaced apart defining an air gap between the stator and the rotor.

7. The cooling system as recited in claim 6, wherein the airflow flows between the stator and the rotor to cool the rotor.

8. The cooling system as recited in claim 7, wherein the electric drive system is a brushless permanent magnet motor.

9. The cooling system as recited in claim 8, wherein the rotor comprises permanent magnets.

* * * * *